(12) United States Patent
Sharma et al.

(10) Patent No.: US 8,989,181 B2
(45) Date of Patent: *Mar. 24, 2015

(54) METHOD AND SYSTEM FOR MULTICASTING DATA PACKETS IN AN MPLS NETWORK

(75) Inventors: Shantnu Sharma, Acton, MA (US);
Snigdho C. Bardalai, Plano, TX (US);
Edward Alton Harbin, Dallas, TX (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/929,116

(22) Filed: Oct. 30, 2007

(65) Prior Publication Data

US 2008/0056258 A1    Mar. 6, 2008

Related U.S. Application Data

(63) Continuation of application No. 10/607,442, filed on Jun. 25, 2003, now Pat. No. 7,372,853.

(51) Int. Cl.
*H04L 12/28* (2006.01)
*H04L 12/723* (2013.01)
*H04L 12/701* (2013.01)
*H04L 12/761* (2013.01)

(52) U.S. Cl.
CPC ............... *H04L 45/50* (2013.01); *H04L 45/00* (2013.01); *H04L 45/16* (2013.01)
USPC .......................................... 370/390; 370/432

(58) Field of Classification Search
CPC ....... H04L 45/50; H04L 45/507; H04L 45/16; H04L 12/18; H04L 47/806
USPC ................................................... 370/390, 432
See application file for complete search history.

(56) References Cited

U.S. PATENT DOCUMENTS

| | | | |
|---|---|---|---|
| 5,541,927 A | 7/1996 | Kristol et al. | 370/94.2 |
| 6,252,857 B1 | 6/2001 | Fendick et al. | 370/254 |
| 6,336,129 B1 * | 1/2002 | Ise et al. | 709/201 |
| 6,374,303 B1 * | 4/2002 | Armitage et al. | 709/242 |
| 6,466,985 B1 | 10/2002 | Goyal et al. | 709/238 |
| 6,778,531 B1 | 8/2004 | Kodialam et al. | 370/390 |
| 7,877,508 B1 * | 1/2011 | Jain et al. | 709/238 |
| 2002/0085553 A1 | 7/2002 | Ku et al. | 370/389 |
| 2002/0112072 A1 | 8/2002 | Jain | 709/239 |

(Continued)

OTHER PUBLICATIONS

Wu et al. "MPLS Multicast Traffic Engineering". draft-wu-mpls-multicast-te-00.txt. Jun. 1999.*

(Continued)

*Primary Examiner* — Chirag Shah
*Assistant Examiner* — Jenkey Van
(74) *Attorney, Agent, or Firm* — Baker Botts L.L.P.

(57) ABSTRACT

A method for multicasting data packets is provided. The method includes preparing multiple point to point connections between a root node and multiple destination nodes to establish point to multipoint connections. The method also includes receiving, at an intermediate node which is operatively connected to the root node and a plurality of the destination nodes, a data packet from the root node. In addition, the method includes determining whether the received data packet is a multicast data packet and generating a plurality of the data packets by copying the received data packet if the received data packet is a multicast data packet. Furthermore, the method includes forwarding the copied data packets to a plurality of the destination nodes.

7 Claims, 3 Drawing Sheets

(56) References Cited

U.S. PATENT DOCUMENTS

| | | | |
|---|---|---|---|
| 2002/0126671 A1 | 9/2002 | Ellis et al. | 370/390 |
| 2003/0099235 A1* | 5/2003 | Shin et al. | 370/390 |
| 2004/0037279 A1* | 2/2004 | Zelig et al. | 370/390 |
| 2004/0151180 A1* | 8/2004 | Hu et al. | 370/392 |
| 2004/0264462 A1* | 12/2004 | Bardalai et al. | 370/390 |
| 2006/0039364 A1* | 2/2006 | Wright | 370/352 |

OTHER PUBLICATIONS

Abou-Of, Mona A., "Minimal Bandwidth Multicast-Broadcast Routing Algorithms," Proceedings of ICCT 2003, pp. 338-347, 2003.

Law, Lap Kong, "Understanding and Exploiting the Trade-Offs between Broadcasting and Multicasting in Mobile Ad Hoc Networks," IEEE Transactions of Mobile Computing, vol. 6, No. 3, pp. 264-279, Mar. 2007.

Scheutzow, Michael, "Multicast Capacity of Packet-Switched Ring WDM Networks," IEEE Transactions on Information Theory, vol. 54, No. 2, pp. 623-644, Feb. 2008.

Sargento, Susana, "Multicast Mobility in Heterogeneous Technologies: Experimental Validation," IEEE Communications Society, IEEE "Globecom" 2009 Proceedings, 8 pages, 2009.

* cited by examiner

METHOD AND SYSTEM FOR MULTICASTING DATA PACKETS IN AN MPLS NETWORK

CROSS-REFERENCE TO RELATED APPLICATION

This application is a continuation of U.S. application Ser. No. 10/607,442, filed Jun. 25, 2003 and entitled "Method and System for Multicasting Data Packets in an MPLS Network".

TECHNICAL FIELD OF THE INVENTION

This invention relates generally to electronic communications and more particularly to a method and system for multicasting data packets in an MPLS network.

BACKGROUND

Computer networks are often used in today's society to transfer data. A computer network is formed by network devices, referred to as nodes, that are physically and virtually interconnected. The network devices may communicate with one another using different protocols, such as Asynchronous Transfer Mode ("ATM") or Internet Protocol ("IP").

Multiprotocol Label Switching ("MPLS") technology improves network traffic flow and management for communications using these and other protocols. MPLS involves setting up a specific path for a sequence of data packets. Each node in the path receives a data packet and then forwards the packet to the next node in the path until the data packet reaches its intended destination. By labeling each packet, MPLS saves time needed for a node to look up the address to the next node in the path when forwarding the packet.

MPLS may be used to support Transport LAN Services ("TLS"), which may involve transmitting a data packet from one source point of a network to more than one destination point. This is referred to as a point-to-multipoint ("P2MP") transmission or "multicasting." To support multicasting, a source node using MPLS often establishes multiple point-to-point tunnels (referred to as "unicast" tunnels) with intermediate nodes to form paths to the destination nodes. Each unicast tunnel is operable to carry one data packet at a time from one node to another node.

The number of unicast tunnels needed between a source node and an intermediate node may depend on the number of destination nodes that are downstream from the source node. For example, if a source node is associated with three destination nodes through an intermediate node, then three unicast tunnels may be required between the root node and the intermediate node so that the intermediate node may receive three of the same data packet. Then the intermediate node forwards the three packets to the three respective destination nodes. Having three unicast tunnels between the root node and the intermediate node requires three different bandwidths to be reserved using three pairs of resource reservation ("RSVP") connections.

SUMMARY

According to one embodiment of the invention, a method for multicasting data packets is provided. The method includes preparing multiple point to point connections between a root node and multiple destination nodes to establish point to multipoint connections. The method also includes receiving, at an intermediate node which is operatively connected to the root node and a plurality of the destination nodes, a data packet from the root node. In addition, the method includes determining whether the received data packet is a multicast data packet and generating a plurality of the data packets by copying the received data packet if the received data packet is a multicast data packet. Furthermore, the method includes forwarding the copied data packets to a plurality of the destination nodes.

Some embodiments of the invention provide numerous technical advantages. Other embodiments may realize some, none, or all of these advantages. For example, according to one embodiment, bandwidth use for multicasting of a data packet is reduced. In one embodiment, the number of RSVP connections for setting up tunnels in an MPLS connection tree is reduced, which simplifies the multicasting process.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF THE DRAWINGS

Embodiments of the invention are best understood by referring to FIGS. 1 through 5 of the drawings, like numerals being used for like and corresponding parts of the various drawings.

Figure 1:
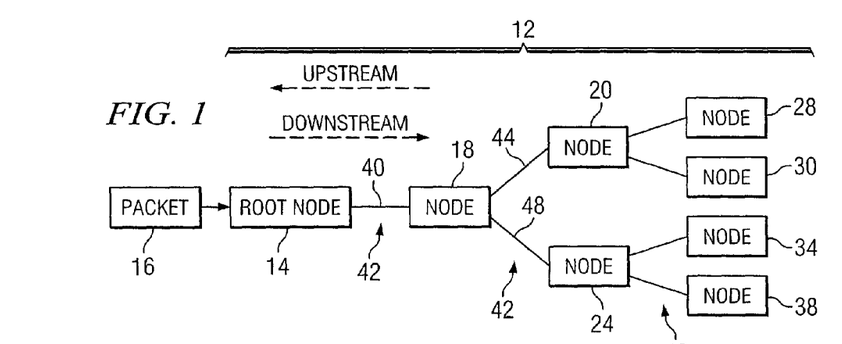
FIG. 1 is a schematic diagram illustrating one embodiment of a network comprising point-to-multipoint MPLS connections that may benefit from the teachings of the present invention.

FIG. 1 is a schematic diagram illustrating a multi-protocol label switching ("MPLS") network 10 that may benefit from the teachings from the present invention. MPLS network 10 comprises nodes 14, 18, 20, 24, 28, 30, 34, and 38. Nodes 14, 18, 20, 24, 28, 30, 34, and 38 are jointly referred to herein as nodes 12. Node 14 may be referred to as root node 14 because in the example shown in FIG. 1, node 14 is the first node in network 10 to receive a data packet 16 to be transmitted to multiple destinations in network 10. To avoid redundancy in description of some embodiments of the invention, nodes 28, 30, 34, and 38 are referred to as destination nodes of packet 16; however, any node 12 that receives packet 16 may be a destination node. In some cases, network 10 may be one of many branches of an MPLS point-to-multipoint ("P2MP") connection tree, where each branch includes one or more destination nodes of a data packet.

MPLS technology involves setting up a specific path to send data packet 16 to its destination. Where data packet 16 is sent from one node 12 to another node 12, a point-to-point tunnel is established between the two nodes 12. Such a pointto-point tunnel is referred to as a "unicast" tunnel. A unicast tunnel may be established between two nodes 12 using resource reservation protocol ("RSVP"). For example, root node 14 may send an RSVP request to node 18 through an RSVP connection requesting a reservation of bandwidth that is sufficient to carry packet 16. Node 18 may respond to the bandwidth reservation request by transmitting a label that identifies node 18 to root node 14, which indicates that the requested amount of bandwidth is reserved to receive packet 16. Then a unicast tunnel that occupies the requested bandwidth is established between nodes 14 and 18.

A need to transmit packet 16 to more than one destination may arise when MPLS is used to support transport LAN services ("TLS"). Transmitting a data packet from one source to multiple receivers is referred to as "multicasting." To accommodate the multicasting, each node in a network may be operable to establish multiple connections with multiple nodes. For example, as shown in FIG. 1, tunnels 42 that may take packet 16 from root node 14 to destination nodes 28, 30, 34, and 38 are established. Root node 14 may initiate the establishment of tunnels 42 using RSVP protocol based on the addressing information included in packet 16. After establishing the necessary tunnels 42, each node 12 is operable to receive data packet 16 and forward data packet 16 to another node 12 in paths 42 according to forwarding information included in packet 16. Forwarding information includes labels identifying a specific path 42 that lead to destination nodes 28, 30, 34, and/or 38.

To allow a particular node 12 to send packet 16 to multiple nodes 12, packet 16 may need to be sent to the particular node 12 multiple times. For example, once packet 16 is received at node 20, node 20 sends packet 16 to two destination nodes 28 and 30, as shown in FIG. 1. To send packet 16 to two destination nodes 28 and 30, node 20 needs to receive two packets 16 from node 18. To receive two packets 16, a connection 44 comprising two unicast tunnels—one for each of the two packets 16—is needed between nodes 18 and 20. Analogously, a connection 48 between nodes 18 and 24 comprises two unicast tunnels because node 24 needs to receive two packets 16 from node 18 to respectively forward to two destination nodes 34 and 38.

To allow node 18 to send four packets 16—two to node 20 and two to node 24, root node 14 may need to send packet 16 to node 18 four times. Thus, a connection 40 may include four separate unicast tunnels, where each unicast tunnel may require a separate range of bandwidth to be reserved through a separate exchange of an RSVP request and response. Because multiple unicast tunnels may be needed between two nodes 12 that are upstream from destination nodes 28, 30, 34, and 38, more bandwidth is used to multicast packet 16. "Upstream" direction refers to a direction that is generally opposite from the direction of data packet flow. "Downstream" direction refers to the same direction as the direction of data packet flow.

According to one embodiment of the present invention, a method and system for multicasting data packets are provided. In one embodiment, bandwidth use for multicasting of a data packet is reduced. In one embodiment, the number of RSVP connections for setting up tunnels in an MPLS connection tree is reduced, which simplifies the multicasting process. Additional details of example embodiments of the invention are described below in greater detail in conjunction with FIGS. 2 through 5.

Figure 2:
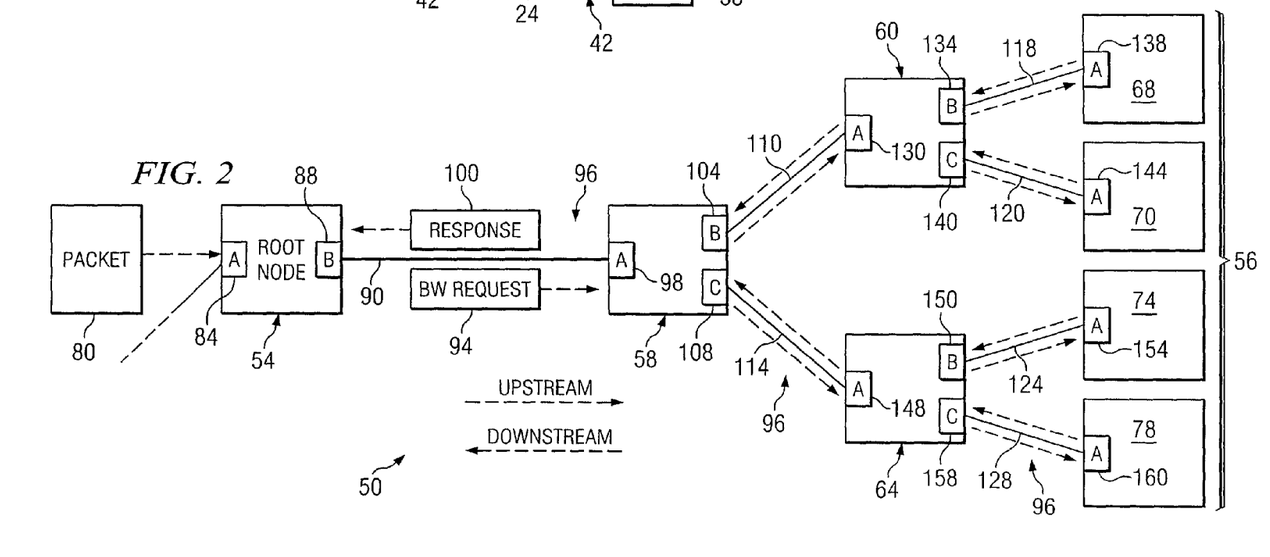
FIG. 2 is a schematic diagram illustrating one embodiment of a network operable to conduct multicasting according to the teachings of the present invention.

FIG. 2 is a schematic diagram illustrating one embodiment of a network 50 operable to multicast a data packet 80 according to the teachings of the present invention. In one embodiment, network 50 is a branch of a point-to-multipoint MPLS connection tree, and may be referred to as branch 50 for exemplary purposes. Branch 50 comprises nodes 54, 58, 60, 64, 68, 70, 74, and 78, which are jointly referred to as nodes 56. Node 56 may be any suitable computing device, such as a router, that is operable to receive packet 80, and when appropriate, forward packet 80 to one or more suitable destinations based on information included in packet 80. Any node 56 that may need to forward packet 80 to multiple destinations (also referred to as intermediate nodes 56) may be operable to send packet 80 multiple times over appropriate tunnels 96 without receiving more than one of packet 80. Such nodes 56 are operable to select the appropriate tunnels 96 using multicast tables respectively stored in the nodes 56. Additional details concerning a multicast table are provided below in conjunction with FIGS. 3A THROUGH 3C. Because nodes 56 need to receive only one of packets 80 to forward packet 80 to multiple destinations, only one unicast tunnel that occupies sufficient bandwidth to accommodate packet 80 is needed between two nodes 56, which reduces overall bandwidth usage by upstream nodes 56. Further, the number of RSVP connections between two nodes 56 is reduced.

Node 54 is referred to as root node 54 because it is the first node in branch 50 that receives packet 80. Root node 54 is operable to receive packet 80 over an MPLS connection and determine that packet 80 is a packet that is to be multicast to numerous destinations, such as nodes 68, 70, 74, and 78. Because packet 80 is to be multicast, packet 80 may be referred to as multicast packet 80.

In one embodiment, root node 54 is operable to determine that packet 80 is a multicast packet by detecting an identifier in packet 80 that identifies packet 80 as a multicast packet. Based on the addressing information in packet 80 that identifies nodes 68, 70, 74, and 78 as destination nodes, root node 54 is operable to initiate an establishment of an MPLS tunnel 90 between nodes 58 and 54, an MPLS tunnel 110 between nodes 60 and 58, an MPLS tunnel 114 between nodes 64 and 58, an MPLS tunnel 118 between nodes 68 and 60, an MPLS tunnel 120 between nodes 70 and 60, an MPLS tunnel 124 between nodes 74 and 64, and an MPLS tunnel 128 between nodes 78 and 64. Tunnels 90, 110, 114, 118, 120, 124, and 128 are jointly referred to as tunnels 96. In one embodiment, node 54 may initiate an establishment of tunnels 96 by signaling other nodes 56 to establish a tunnel 96 with a particular node 56. The signal may use RSVP protocol and may include a unique identifier that identifies all tunnels 96 to be formed between nodes 56. Each tunnel 96 may be established by an exchange of RSVP request and response between the respective node pairs, as shown in FIG. 2 by a pair of dotted arrows associated with each tunnel 96.

Although nodes 68, 70, 74, and 78 are used as destination nodes, other nodes 56 in branch 50 may be destination nodes. Because of this, more or less tunnels 96 may be established between different nodes 56 depending on the destinations identified by packet 80. For example, root node 54 may not initiate an establishment of tunnels 118, 120, 124, and 128 if packet 80 indicates that its destination nodes are nodes 60 and 64. In such a case, only tunnels 90, 110, and 114 would be established. By initiating an establishment of tunnels 96, root node 54 provides paths for packet 80 to reach its destination nodes 68, 70, 74, and 78.

Each node 56 has a connection interface that corresponds to each tunnel 96. Further, each interface has its own identifier that is unique within each node 56. An interface allows node 56 to establish and maintain one tunnel 96 with another node 56. Each tunnel 96 occupies sufficient bandwidth to accommodate a data packet. In one embodiment, each tunnel 96 has sufficient bandwidth to accommodate only one data packet.

Referring to node 54, an interface 84 corresponds to the tunnel through which packet 80 is received. An interface 88 corresponds to tunnel 90. Referring to node 58, interfaces 98, 104, and 108 respectively correspond to tunnels 90, 110, and 114. Referring to node 60, interfaces 130, 134, and 140 respectively correspond to tunnels 110, 118, and 120. Referring to nodes 64, interfaces 148, 150, and 158 respectively correspond to tunnels 114, 124, and 128. Respective interfaces 138, 144, 154, and 160 of nodes 68, 70, 74, and 78 respectively correspond to tunnels 118, 120, 124, and 128. In one embodiment, all tunnels 96 in branch 50 are labeled using a single label, such as "1" as shown in FIG. 2, for reasons explained below.

To establish tunnel 90 after receiving multicast packet 80, root node 54 may transmit a bandwidth reservation request 94 to node 58 to initiate an establishment of tunnel 90. In response, node 58 may transmit a response 100 to root node 54. Response 100 may include information such as a label identifying node 58. After transmitting response 100, tunnel 90 is established between nodes 58 and 54. Although packet 80 is to be multicast to four different destination nodes 68, 70, 74, and 78, only one tunnel 90 occupying sufficient bandwidth to accommodate one packet 80 is established between nodes 54 and 58, in one embodiment. Analogously, in one embodiment, only one tunnel 110 occupying sufficient bandwidth to accommodate one packet 80 is established between nodes 60 and 58, even though node 60 is to transmit two packets 80 to nodes 68 and 70, respectively. Analogously, in one embodiment, only one tunnel 114 occupying sufficient bandwidth to accommodate one packet 80 is established between nodes 64 and 58, even though node 64 is to transmit two packets 80 to nodes 74 and 78, respectively.

In one embodiment, root node 54 may transmit more than one bandwidth reservation request 94 to node 58 in an attempt to send packet 80 multiple times to node 58. For example, root node 54 may attempt to transmit four bandwidth reservation requests 94 to establish four separate tunnels 90 because packet 80 is associated with four destination nodes 68, 70, 74, and 78 in its downstream direction, as shown in FIG. 2. In such an embodiment, node 58 is operable to receive multiple requests 94, determine that the requests are for same data packet 80, and send only response 100 back to root node 54. Thus, only one tunnel 94 is established between nodes 58 and 54 regardless of the number of destinations indicated by packet 80. An analogous process may be used to establish a single tunnel 96 between each pair of nodes 56 in branch 50.

Prior to transmitting packet 80 through tunnel 90, root node 54 inserts a label that identifies established tunnels 96 that constitute the paths leading to destination nodes 68, 70, 74, and 78. After node 58 receives packet 80 and reading the label in the packet 80, node 58 determines, using a multicast table stored in node 58, that packet 80 is to be forwarded through interfaces 104 and 108. A multicast table allows node 58 to make such a determination because a multicast table associates a label identifying tunnels 96 with interfaces of node 58 that correspond to the tunnels 96. From receiving multiple RSVP requests 94 for the same data packet 80, a node, such as node 58, may be operable to determine that a multicast table should be used rather than a unicast table. After identifying interface 104 using a multicast table, packet 80 is transmitted over tunnel 110 through interface 104. Packet 80 is also transmitted over tunnel 114 through interface 108.

After node 60 receives packet 80 and reading the label in the packet 80, node 60 determines, using a multicast table stored in node 60, that packet 80 is to be forwarded through interfaces 134 and 140. A multicast table allows node 60 to make such a determination because a multicast table associates a label identifying tunnels 96 with interfaces of node 60 that correspond to the tunnels 96. Then node 60 transmits packet 80 over tunnel 118 through interface 134. Packet 80 is received by node 68 through interface 138. Node 60 also transmits packet 80 over tunnel 120 through interface 140. Node 70 receives packet 80 through interface 144.

After node 64 receives packet 80 and reading the label in the packet 80, node 64 determines, using a multicast table stored in node 64, that packet 80 is to be forwarded through interfaces 150 and 158. A multicast table allows node 64 to make such a determination because a multicast table associates a label identifying tunnels 96 with interfaces of node 64 that correspond to the tunnels 96. Node 64 transmits packet 80 over tunnel 124 through interface 150. Node 74 receives packet 80 through interface 154. Node 64 transmits packet 80 over tunnel 128 through interface 158. Node 78 receives packet 80 through interface 160. Thus, packet 80 is multicast to destination nodes 68, 70, 74, and 78.

Using a multicast table to send a copy of packet 80 to each downstream node 56 is advantageous in some embodiments because the amount of bandwidth that is used to multicast packet 80 is reduced by establishing only one tunnel 96 between two upstream nodes 56. This is in contrast with existing methods where nodes 56 may be required to establish multiple unicast tunnels with another upstream node 56 depending on the number of associated downstream destination nodes. This is also advantageous in some embodiments because less RSVP connections are required to transmit packet 80 between nodes 56 because the overall number of tunnels is reduced.

Figure 3A:
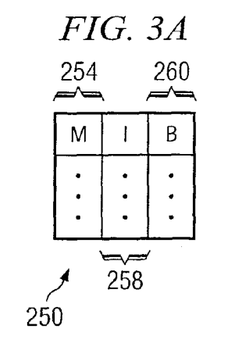
FIGS. 3A through 3C are schematic diagrams illustrating some embodiments of a multicast table that may be used in conjunction with nodes in FIG. 2 to multicast a data packet.

FIGS. 3A through 3C are schematic diagrams illustrating some embodiments of a multicast table that may be used in conjunction with nodes 56. Referring to FIG. 3A, a multicast table 250 includes columns 254, 258, and 260. In one embodiment, multicast table 250 may be stored in and used by node 54; however, other nodes 56 may store and use multicast table 250 depending on how an P2MP branch is defined. Column 254 is for listing labels that may be used to identify a multicast packet. For example, as shown in FIG. 3A, a label "M" indicates a multicast packet and the label "M" included in a data packet would indicate that the packet is a multicast packet. Column 258 is for listing labels that identify one or more MPLS tunnels, and column 260 is for listing interfaces of node 56 that are associated with each tunnels identified by the labels in column 258. As shown in FIG. 3A, branch label "1," which identifies one or more tunnels 96 that lead to packet's 80 destination nodes 68, 70, 74, and 78, is associated with an interface "B" of node 54, which is interface 88.

In one embodiment, all tunnels 96 that serve as paths leading to destination nodes 68, 70, 74, and 78 are labeled with a single label, such as label "1". Thus, table 250 indicates that for a packet that includes label "M," (as shown in column 254), tunnels 96 that are identified by label "1" should be used to forward the packet (as shown in column 258), and the interface that corresponds to tunnel 96 is accessible through interface "B" (as shown in column 260), which is interface 88.

Figure 3B:
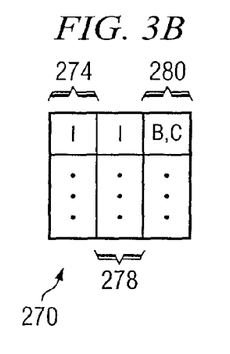

Referring to FIG. 3B, a multicast table 270 includes columns 274, 278, and 280. In one embodiment, multicast table 270 may be stored in and used by node 58; however, other nodes 56, such as intermediate nodes 60 and 64, may store and use multicast table 270. Column 274 is for listing labels of tunnels 96 through which packet 80 is received. Column 278 is for listing labels of tunnels 96 through which packet 80 is to be forwarded. Column 280 is for identifying interfaces of node 58 that correspond to tunnels 96 identified by labels listed in column 278.

As shown in FIG. 3B, label "1," which identifies all of tunnels 96 in one embodiment, is in both columns 274 and 278, which indicates that a packet that is received through a tunnel 96 labeled "1" should be forwarded using one or more tunnels labeled "1." Because packet 80 is received through tunnel 90, which is labeled "1," packet 80 will be forwarded over tunnels 110 and 114, which are also labeled "1." And the interfaces that correspond to tunnels labeled "1" for forwarding the packet are interfaces "B" and "C", as shown in column 280, which are interfaces 104 and 108, respectively.

Figure 3C:
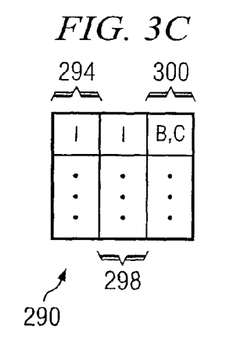

Referring to FIG. 3C, a multicast table 290 includes columns 294, 298, and 300. In one embodiment, multicast table 290 may be stored in and used by nodes 60 and/or 64; however, other nodes 56 may store and use multicast table 290. Column 294 is for listing labels of tunnels 96 through which packet 80 is received. Column 298 is for listing labels of tunnels 96 through which packet 80 is to be forwarded. Column 300 is for identifying interfaces of nodes 60 or 64—depending on where multicast table 290 is stored—that correspond to tunnels 96. As shown in FIG. 3C, label "1," which identifies all of tunnels 96 in one embodiment, is in both columns 294 and 298, which indicates that a packet that is received through a tunnel labeled "1" should be forwarded using one or more tunnels labeled "1." And the interfaces that correspond to tunnels labeled "1" for forwarding the packet are interfaces "B" and "C", as shown in column 300, which are interfaces 104 and 108 for node 60 and interfaces 150 and 158 for node 64.

Figure 3D:
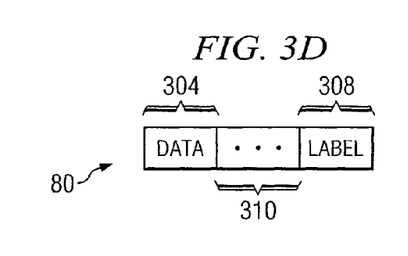
FIG. 3D is a schematic diagram illustrating one embodiment of a data packet shown in FIG. 2 that may be transmitted to multiple destinations according to the information in the multicast tables of FIGS. 3A through 3C.

FIG. 3D is a schematic diagram illustrating one example of packet 80. Packet 80 comprises a payload section 304, a label section 308, and other sections 310 that may be used to include other information, such as Time To Live ("TTL") data and addressing information. The labels that may be carried by packet 80 are included in label section 308. Labels included in label section 308 allow node 56 to read and compare the labels to a multicast table to determine what interface should be used to forward packet 80. For example, labels identifying packet 80 as a multicast packet and labels of MPLS tunnels to destination nodes may be included in label section 308.

Figure 4:
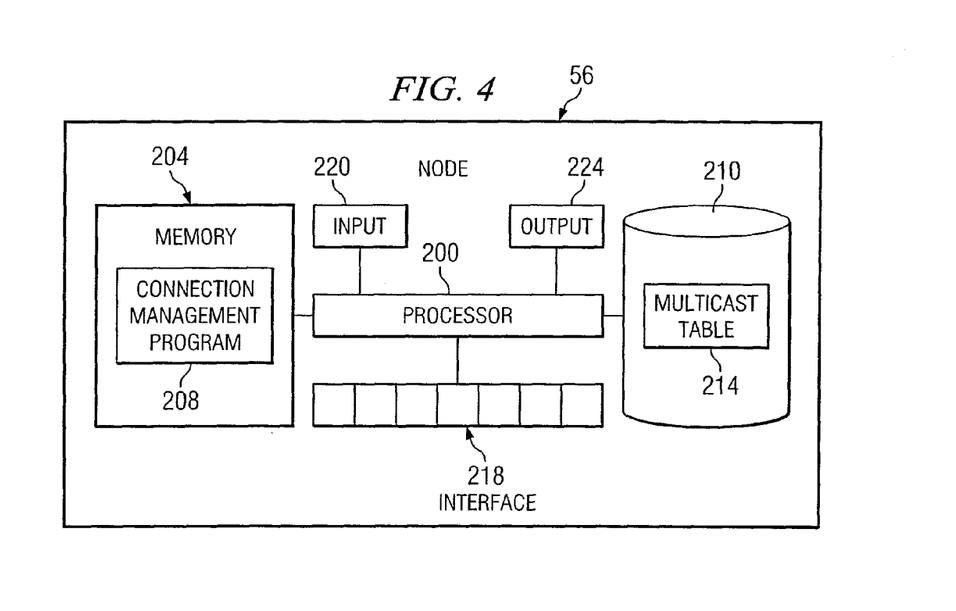
FIG. 4 is a block diagram illustrating a node shown in FIG. 2.

FIG. 4 is a block diagram illustrating one embodiment of node 56 shown in FIG. 2. Node 56 comprises a processor 200, a memory unit 204 storing a connection management program 208, a data storage unit 210 storing a multicast table 214, one or more interfaces 218, an input unit 220, and an output unit 224. Processor 200 is operable to execute logic of program 208 and access data storage unit 210 to retrieve, store, or read data included in multicast table 214. Examples of process of 200 are PENTIUM processors available from Intel Corporation.

Program 208 is a computer program that controls node 56. Program 208, when executed using processor 200, is operable to establish one tunnel 96 between nodes 56 and another node, detect whether packet 80 is a multicast packet, and access multicast table 214 to determine the identities of interfaces 218 that will be used to forward packet 80. Program 208 may reside in any storage medium, such as memory 204 or data storage unit 210. Program 208 may be written in any suitable computer language, including C or C++.

Memory 208 and data storage unit 210 may comprise files, stacks, databases, or any other suitable forms of data. Memory 204 and data storage unit 210 may be random access memory, ready only memory, CD-ROM, removable memory devices, or any other suitable devices that allow the storage and/or retrieval of data. Memory 204 and storage unit 210 may be interchangeable and may perform the same functions. Input device 220 may be any device operable to provide input from a user to node 56. Output device 224 may be any device operable to communicate information generated by node 56 to a user. Each interface 218 allows nodes 56 to transmit or receive a packet, such as data packet 80, over a particular MPLS tunnel.

Figure 5:
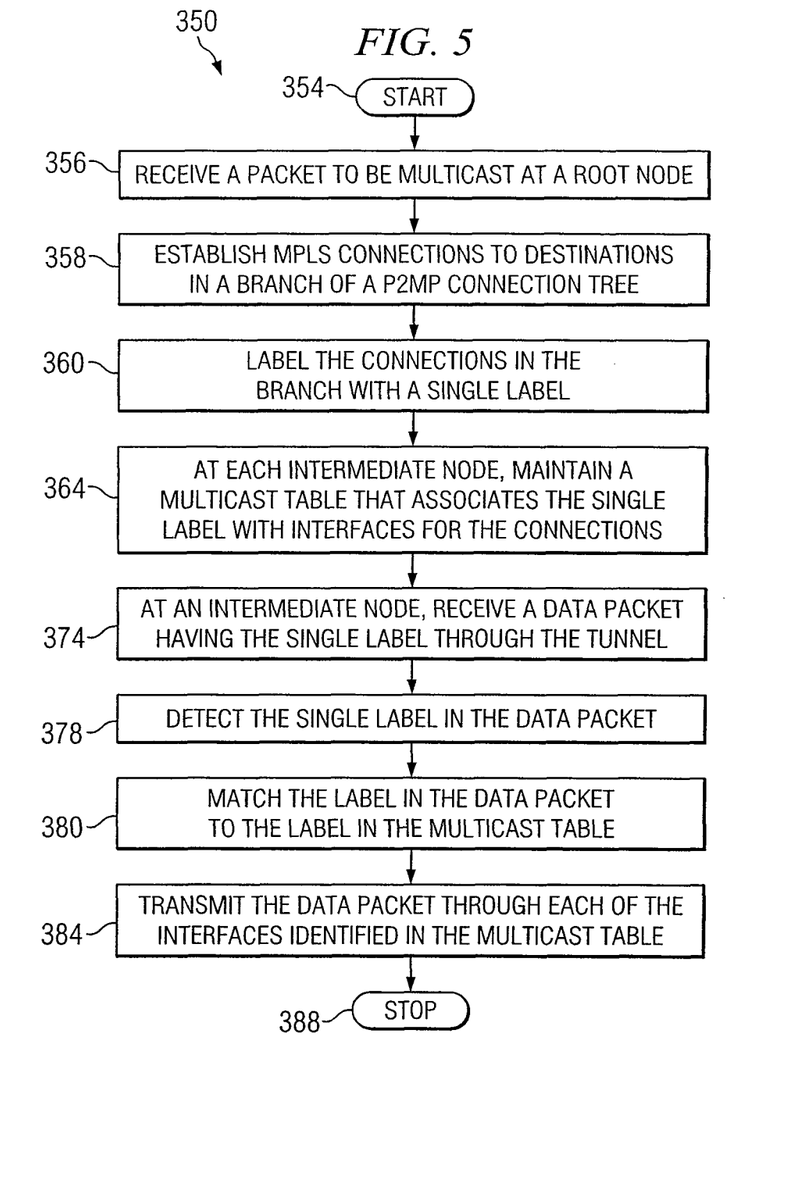
FIG. 5 is a flowchart illustrating one embodiment of a method for multicasting data packets.

FIG. 5 is a flowchart illustrating one embodiment of a method 350 for multicasting a data packet. Some or all acts of method 350 may be performed using program 208 shown in FIG. 4. Method 350 is described using network 50 shown in FIG. 2; however, method 350 may be used in conjunction with any branch of an MPLS connection tree. In some embodiments, steps 356 through 384 may be performed in different order. Some steps 356 through 384 may be performed concurrently.

Method 350 starts at step 354. At step 356, packet 80 that will be multicast is received at node 54. At step 358, MPLS tunnels 96 are established using RSVP protocol to provide the requisite paths for packet 80 to reach its destination nodes 68, 70, 74, and 78. In one embodiment, only one MPLS tunnel 96 sufficient to accommodate only one packet 80 is established between each pair of nodes 56, which reduces bandwidth use for nodes 56 that are upstream from destination nodes 68, 70, 74, and 78. In one embodiment, multiple RSVP requests for the same data packet 80 sent by one node 56 is answered with only one RSVP response, which establishes only one tunnel 96 for a multicast data packet. At step 360, tunnels 96 established in step 358 are identified by a single label. However, different labels may be assigned to different tunnels 96 so long as multicast tables used in different nodes 56 properly identify the appropriate tunnels 96 that lead to destination nodes 68, 70, 74, and 78.

At step 364, a multicast table is maintained at each node 56, such as nodes 54, 58, 60, and 64, that may receive and forward packet 80. Each multicast table associates a label identifying one or more tunnels 96 with one or more corresponding interfaces of the node 56. At step 374, data packet 80 that includes one or more labels of tunnels 96 to be used for forwarding packet 80 is received through an established tunnel 96. At step 378, the branch label in data packet 80 is detected. At step 380, the detected label is matched to a label listed in the multicast table of node 56 receiving packet 80. At step 384, data packet 80 is transmitted through each of the interfaces identified in the multicast table that are associated with a matched label. Method 350 stops at step 388.

Although some embodiments of the present invention have been described in detail, it should be understood that various changes, substitutions, and alterations can be made hereto without departing from the spirit and scope of the invention as defined by the appended claims.

What is claimed is:

1. A method for multicasting data packets, comprising:
preparing a plurality of point to point connections between a root node and a plurality of destination nodes to establish point to multipoint connections;
receiving a plurality of resource reservation protocol (RSVP) requests from the root node at an intermediate node, the intermediate node operatively connected to the root node and a plurality of the destination nodes, each of the RSVP requests requesting an establishment of a unicast tunnel between the root node and the intermediate node;
in response to plurality of RSVP requests, establishing only one unicast tunnel for delivery of a multicast data packet;
establishing a plurality of second connections each operatively connecting each destination node to the intermediate node, comprising transmitting a signal to the intermediate node, the signal including a unique identifier identifying all connections to be formed between the intermediate node and the destination nodes;

receiving a data packet from the root node at the intermediate node through the only one unicast tunnel;

determining whether the received data packet is the multicast data packet;

generating a plurality of the data packets by copying the received data packet in response to determining that the received data packet is the multicast data packet; and forwarding the copied data packets to a plurality of the destination nodes through the second connections, comprising forwarding the copied data packets to the plurality of destination nodes through connection interfaces of the intermediate node identified in a multicast table, wherein the multicast table associates the identified connection interfaces with the unique identifier.

2. The method of claim 1, wherein establishing the only one unicast tunnel comprises sending, from the intermediate node, only one response to the reservation protocol requests.

3. An intermediate node for multicasting data packets, comprising:

a connection manager operable to:
prepare a plurality of point to point connections between a root node and a plurality of destination nodes to establish point to multipoint connections;
receive a plurality of one or more resource reservation protocol (RSVP) requests from the root node, each of the RSVP requests requesting an establishment of a unicast tunnel between the root node and the intermediate node;
in response to the RSVP requests, establishing only one unicast tunnel for delivery of a multicast data packet;
establish a plurality of second connections each operatively connecting each destination node to the intermediate node, comprising transmitting a signal to the intermediate node, the signal including a unique identifier identifying all connections to be formed between the intermediate node and the destination nodes;

a receiver operable to receive a data packet from the root node through the only one unicast tunnel;

a controller operable to determine whether the received data packet is the multicast data packet and to generate a plurality of the data packets by copying the received data packet in response to determination that the received data packet is the multicast data packet; and, a transmitter operable to forward the copied data packets to a plurality of the destination nodes through the second connections by forwarding the copied data packets to the plurality of destination nodes through connection interfaces of the intermediate node identified in a multicast table, wherein the multicast table associates the identified connection interfaces with the unique identifier.

4. A method for multicasting data packets, comprising:
preparing a point to point connection between a root node and a destination node, the point to point connection constituting one of a plurality of point to point connections between the root node and a plurality of destination nodes to establish point to multipoint connections;
from an intermediate node, which is operatively connected to the root node and a plurality of the destination node, the intermediate node being operatively connected to the root node by a single unicast tunnel for delivery of a multicast data packet, receiving a copy of a data packet which the intermediate node received from the root node, wherein the copy of the data packet was generated at the intermediate node in response to determining that the received data packet is the multicast data packet to each destination node;
establishing a plurality of first connections each operatively connecting each destination node and the intermediate node, comprising receiving a signal including a unique identifier identifying all connections to be formed between the intermediate node and the destination nodes; and
receiving and reforwarding the copy of the multicast data packet through the first connections through connection interfaces of the intermediate node as identified in a multicast table, wherein the multicast table associates the identified connection interfaces with the unique identifier.

5. An apparatus for receiving a multicast data packet, comprising:

a connection manager operable to:
prepare a point to point connection with a root node that constitutes one of a plurality of point to point connections between the root node and a plurality of destination nodes to establish point to multipoint connections; and
establish a first connection operatively connecting the apparatus and the intermediate node, the first connection constituting one of a plurality of connections between each destination node and the intermediate node; and a receiver operable to:
receive, from an intermediate node which is operatively connected to the root node and a plurality of the destination nodes, a copy of a data packet which the intermediate node received from the root node, the intermediate node being operatively connected to the root node by a single unicast tunnel for delivery of a multicast data packet, wherein the copy of the data packet was generated at the intermediate node in response to determining that the received data packet is the multicast data packet to each destination node; and reforward the copy of the multicast data packet through the first connections through connection interfaces of the intermediate node as identified in a multicast table, wherein the multicast table associates the identified connection interfaces with the unique identifier.

6. A method for multicasting data packets, comprising:
providing a root node, a plurality of destination nodes, and an intermediate node which is operatively connected to the root node and a plurality of the destination nodes;
preparing a plurality of point to point connections between the root node and a plurality of the destination nodes via the intermediate node to establish point to multipoint connections;
receiving a plurality of resource reservation protocol (RSVP) requests from the root node at the intermediate node, each of the RSVP requests requesting an establishment of a unicast tunnel between the root node and the intermediate node;
in response to the plurality of RSVP requests, establishing only one unicast tunnel for delivery of a multicast data packet;
establishing a plurality of second connections each operatively connecting each destination node to the intermediate node, comprising transmitting a signal to the intermediate node, the signal including a unique identifier identifying all connections to be formed between the intermediate node and the destination nodes;
receiving, at the intermediate node, a data packet from the root node through the only one unicast tunnel;

determining whether the received data packet is the multicast data packet to be received by a plurality of the destination nodes;

copying the received data packet to generate a plurality of the data packets for a plurality of the destination nodes in response to determining that the received data packet is the multicast data packet; and forwarding the copied data packets to a plurality of the destination nodes through the second connections, comprising forwarding the copied data packets to the plurality of destination nodes through connection interfaces of the intermediate node identified in a multicast table, wherein the multicast table associates the identified connection interfaces with the unique identifier.

7. The method of claim 6, wherein establishing the only one unicast tunnel comprises sending, from the intermediate node, only one response to the reservation protocol requests.

* * * * *